Figure 1:
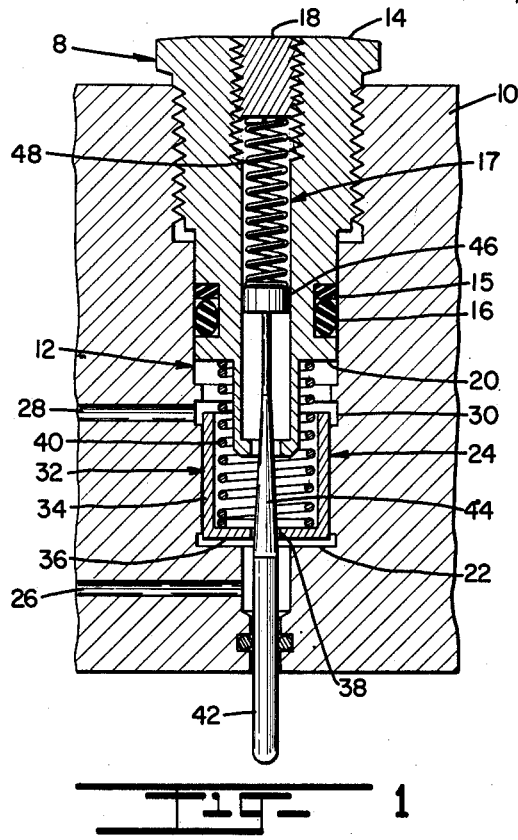

Nov. 10, 1964     D. R. MOODY     3,156,258

FLUID FLOW LIMITING DEVICE

Filed April 19, 1962     2 Sheets-Sheet 1

INVENTOR.
DALE R. MOODY

BY *Philip H. Sheridan*

ATTORNEY

Nov. 10, 1964     D. R. MOODY     3,156,258
FLUID FLOW LIMITING DEVICE
Filed April 19, 1962     2 Sheets-Sheet 2

INVENTOR.
DALE R. MOODY
BY
Philip H. Sheridan
ATTORNEY

United States Patent Office 3,156,258
Patented Nov. 10, 1964

3,156,258
FLUID FLOW LIMITING DEVICE
Dale R. Moody, Englewood, Colo., assignor to Martin Marietta Corporation, Baltimore, Md., a corporation of Maryland
Filed Apr. 19, 1962, Ser. No. 188,684
7 Claims. (Cl. 137—504)

The invention relates to a fluid flow regulation device possessing improved fluid flow reguating characteristics.

Fluid flow controllers of the general type herein described are useful for coupling into a fluid line in which the fluid through applied pressure is used to actuate a piston or other element driving a mass, such as, a lathe, shaper bed or other object. The function of the controller is to control the velocity of the driven mass over either the power stroke or the return stroke by controlling the rate of flow of fluid in the line.

There are a number of disadvantages associated with the construction of prior art flow regulators which it is the object of this invention to overcome. Most of the prior art regulators have a separate connection means, such as a valve stem, between the throttling means and the pressure responsive means. This is a source of error, complicates the construction, and makes the device difficult to adjust. Prior art devices in this field have no means for external adjustment of flow rate in accordance with a predetermined pattern during operation. The internal structure of prior regulators is not protected from back pressure in the outlet line when in a closed position and this makes adjustment difficult to provide accurate and reproducible fluid control characteristics. The construction of prior art regulators is generally not sufficiently rugged to operate satisfactorily under high fluid pressures, that is, on the order of 4500 p.s.i. Many of them will operate in only one orientation. Prior regulators are not operative to provide highly limited deceleration forces and precise control thereof because they are constructed for a relatively high limiting flow rate and will not provide precise control of flow rates well below the limiting value.

It is an object of this invention to provide a flow regulating device of simplified and rugged construction which provides dependable operation under fluid pressures up to at least 4500 p.s.i. Another object is the provision of such a device in which its internal structure is protected from back pressure in the outlet line when the regulator is in the closed position. Still another object is to provide a fluid flow control device incorporating a unitary throttling and pressure responsive element. A further object of the invention is to provide such a device which is automatically adjustable during operation in a fluid flow line to provide varying fluid flow rates, or various settings of fluid flow rate, in accordance with the position of a mass which is being decelerated. Another object of the invention is to provide such a device which has no effect on the movement of the driven mass which it is adapted to control so long as it is moving below a maximum permissible speed.

The flow control regulator of this invention comprises a housing forming a valve chamber having an inlet and outlet and an annular port in the valve chamber wall communicating with the outlet. A movable piston is arranged in the valve chamber so that its base functions as a pressure responsive means and its skirt as a throttling means for the port, thus providing a unitary pressure responsive and throttling means. The opening or passageway in the inlet metering orifice located in the base of the piston is adjustable by a tapered pin movably positioned therein. When the device is operating in a fluid line connected to a piston driving a mass, and the fluid is under pressure either during the power stroke or the return stroke, the pin is made movably responsive to the position of the driven mass as reflected by the position of the piston to change the size of the metering orifice to alter the fluid flow rate through the regulator and thereby control the velocity of the driven mass. It is to be understood that the terms "mass" and "driven mass" as used herein and in the claims refer either to a piston or the mass being driven by the piston.

Figure 3:
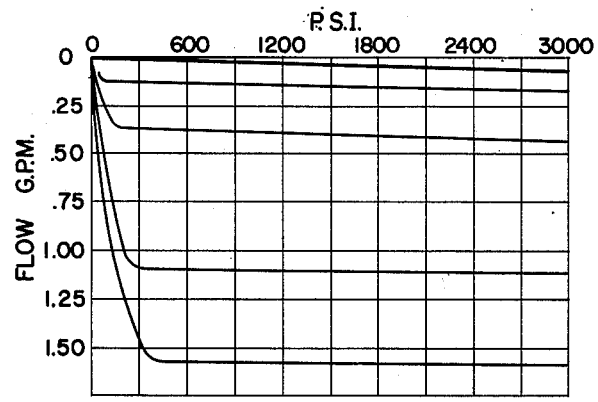
Figure 2:
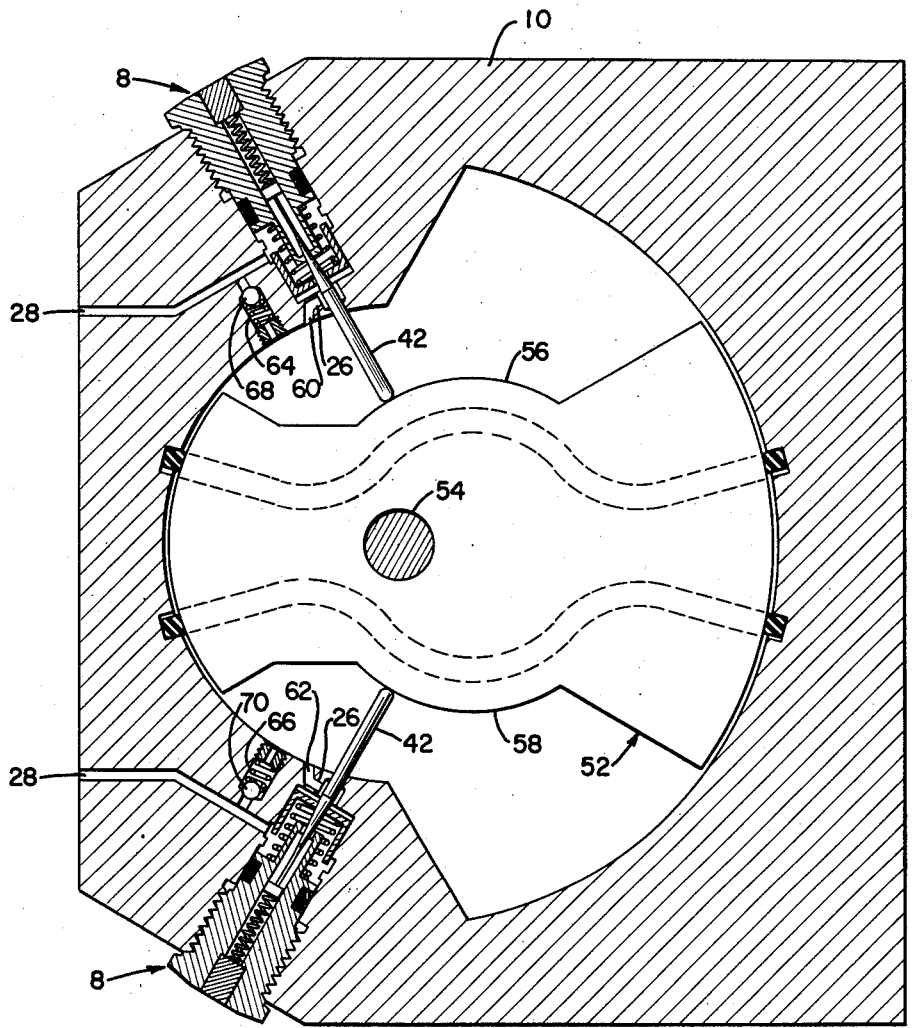

The variable flow limiter of the invention will now be described in conjunction with the drawings wherein like parts are represented by like numerals and in which:

FIG. 1 is a cross-sectional view of the fluid flow regulator of the invention;

FIG. 2 is a schematic sectional view of an actuator device in which the movement of a piston driving a mass is subject to control by fluid flow regulators of the invention in accordance with the position of the mass or piston, and FIG. 3 is a graph in which pressure differential is plotted on the ordinate against fluid flow on the abscissa for various angular positions of the piston of the device of FIG. 2.

Referring to FIG. 1, numeral 8 indicates the regulator and numeral 10 represents the housing of the regulator device having a central well 12 therein into the upper portion of which is seated adjustable retainer 14 by screw threads or otherwise. Gaskets 15 and 16 may be provided to prevent leakage between the retainer 14 and the walls of the central well 12. The retainer 14 has a central bore 17 therein into the top of which is seated adjustable plug 18, that section of the central well 12 between the end 20 of the retainer plug and the bottom wall 22 of the well constituting a valve chamber 24 which is provided with inlet 26, outlet 28 and annular port 30 communicating with outlet 28 as shown. The port 30 is an annular groove cut into the internal wall of the valve chamber 24.

An open-ended piston-type valve element 32 having skirt 34 and bottom wall 36 is arranged in valve chamber 24 for movement back and forth. The bottom wall or base 36 of valve member 32 is provided with a metering orifice 38 through which fluid passes from inlet 26 through the valve chamber to port 30 and out outlet 28. The valve member 32 is resiliently biased in the open position and against upward movement to the closed position by helical spring 40 seated between the upper surface of bottom wall 36 of valve 32 and the end 20 of retainer 14. Other substantially constant force resilient means, such as, a piston working against a fluid may be used instead of the spring. The valve 32 is shown in partially open position under fluid pressure with the upper portion of its skirt 34 partially blocking port 30 to partially obstruct the passage of fluid from the valve chamber through outlet 28. It is seen that when the valve is in the closed position the internal structure of the valve is closed off from back pressure at the outlet.

For adjusting the size of the opening in orifice 38, a tapered pin 42 is mounted in an opening in housing 10 for vertical movement, with its untapered end extending out of the housing and its tapered portion 44 extending through the metering outlet 38 into the valve chamber. In the modification shown, the pin 42 is provided with a head 46 at its upper end and is resiliently biased against upward movement by resilient means such as spring 48. This modification with the spring-biased pin is only necessary when the end of the pin outside of the valve chamber is exposed to pressure substantially above atmospheric pressure. Pin 42 need not be constructed with a symmetrical taper as shown but may be constructed with any taper pattern to provide any desired movement pattern required of the actuating or moving element which actuates it.

The operation of the device is as follows. Fluid pressure through metering orifice 38 in piston 32 changes in relation to the flow rate. When the flow rate through the velocity limiter is below the limiting value, spring 40 maintains piston 32 in the extreme down position, allowing fluid flow to continue through the regulator to annular port 30 and out of the outlet 28. If the flow rate tends to exceed the limiting value, force on piston 32 due to the pressure drop through orifice 38 in the effective area of the piston base 36 causes the piston to rise and restrict flow through the annular port 30. The piston 32 will maintain a position to control the flow at the limiting value as long as the flow tends to exceed this value.

When pin 42 is depressed, the opening through orifice 38 will be decreased thus decreasing the fluid flow rate necessary to produce the pressure drop across piston 32 required to overcome the force of spring 40. In this manner the limiting flow rate of the valve can be externally adjusted. As will be seen from the description which follows, pin 42 can be made movable in response to the position of a mass which is being decelerated to thereby provide for external adjustment of fluid flow rate through the valve in accordance with the position of the mass being decelerated.

It is an advantageous feature of the device that it is so constructed that the piston-type valve element 32 serves not only as a combined pressure responsive means and throttling or valving means but is also arranged concentrically with pin 42 in metering orifice 38 to permit adjustment of the size of the metering orifice by movement of the pin.

Another important feature is the annular port 30 which functions to receive fluid for passage to outlet 28. The use of the groove and outlet combination rather than a hole in the chamber wall constituting one end of an outlet makes the regulator more susceptible to precise adjustment. Use of a hole alone would require more travel of the piston to produce the same change in pressure differential. Further, the construction provides a regulator which is operable in any orientation.

Referring now to FIG. 2, there is shown a cross-sectional schematic view of an actuator device having a piston with its movement controlled by the flow control regulator just described. The particular actuator device used to illustrate this feature of the invention is used for positioning guidance thrust devices on missiles. The actuator device comprises a casing 10 enclosing a paddle-shaped, single acting, fluid driven rotary piston member 52 securely mounted on shaft 54 for rotation therewith. Gaskets between the piston and the casing divide the casing into two fluid tight compartments. The shaft 54 extends beyond the casing and carries a load which is positioned by the movement of the piston. The piston or the load are referred to herein as the "driven mass" as the position of one corresponds to that of the other. The load is not shown as it is not a part of this invention, but in this instance it is a thrust control device for a missile and is positioned by movement of the piston.

The piston moves against a working fluid in the casing. In this instance, it is necessary to snub or decelerate the movement of the piston as it travels toward the stop position or as the thrust guidance device approaches the required position. Snubbing is required because the load on the end of the shaft acquires a large inertia in a radial direction as it is moved into position and will be damaged if its motion is not gradually decelerated before it reaches the required position. The sides of piston 52 are machined in the form of cam surfaces 56 and 58 for purposes which will be explained later.

Two fluid flow regulators 8 are seated in the housing 10 of the actuator and coupled to the actuator in a manner such that working fluid in the casing on either side of the piston communicates with conduits 60 and 62 and with inlets 26 of the regulators. The actuator is shown with the piston in the neutral position. The outlets 28 of the regulators are connected to a source of fluid. Fluid under pressure to drive the piston is admitted into the casing 10 through casing inlets 64 and 66 provided with check valves 68 and 70 to control the direction of flow to and from the casing depending upon the direction of travel of the piston. The fluid flow limiters are positioned so that pins 42 alternately ride on cam surfaces 56 and 58 of piston 52 depending upon its position. These surfaces are designed to vertically position the pin 42 to control the size of the opening in metering orifice 38 and thus provide for a fluid flow rate through the valve as reflected by the position of piston 52.

It is apparent that as the piston 52 is driven in either direction away from the neutral position, pin 42 of the appropriate regulator will be forced inward into the valve chamber an amount governed by the contour of the cam surface thus decreasing the size of the opening in metering orifice 38 to control the fluid flow rate of the regulator and thus gradually control the movement of the piston 52.

The invention including the cam operated by an inertia driven mass, such as a piston or a load, provides for continuous adjustment during operation, of the flow rate in accordance with the deceleration requirements for the mass as reflected by its position at any particular time.

It is to be understood that the arrangement illustrated in FIG. 2 is for the purpose of illustrating the operation of the regulator broadly in combination with a piston or other inertia driven mass requiring deceleration before reaching its stop position. The inertia driven mass represented by the piston and the load could be a lathe, ram, press, other similar type device or the piston driving same.

The means for actuating the pin is not restricted to a cam surface on the piston or load but could be any suitable connecting means between piston and pin or between load and pin which would activate the pin in response to the position of the piston or mass itself or of the mass as reflected by the position of the piston. Any means could be used to actuate the pin which reflects the position of the driven mass.

Reference is made to FIG. 3 showing a graph in which flow rate is plotted on the abscissa against differential pressure on the ordinate for various angular positions of the piston 52. The data plotted on the graph was obtained by setting the piston at a given angle, thus providing a fixed opening in the metering orifice, and varying the pressure in the line by external means. The graph illustrates how the flow rate of the regulator is varied in response to the position of the piston, and that the flow rate remains substantially constant for any given pin setting irrespective of inlet pressure. The regulator has been successfully used under operating pressures in the neighborhood of 4500 p.s.i. to give precise and reproducible flow rate control.

As the above description shows, a fluid flow regulator has been provided by the invention which is rugged and of simplified construction requiring a minimum of working parts. Its construction provides for a unitary pressure responsive and throttling device, and for protection of the internal structure against back pressure when the regulator is closed. A device is provided in which rate of flow can be precisely controlled below relatively low flow control limiting values during operation and in response to the position of an inertia driven mass, the regulator being inoperative to produce any effect on the movement of the mass when it is moving below a maximum permissible speed.

The fluid flow limiting device of the invention has been described for purposes of illustration in connection with a particular actuator requiring a dual installation. It is to be understood that its application is not so limited as it can be used in a single application and in any application where it is necessary to snub the movement of a mass driven directly or indirectly by fluid pressure.

While a preferred form of the present invention has been set forth in detail, it is to be understood that various modifications and changes in the construction may be made without departing from the scope of the method and apparatus of this invention, as defined by the appended claims.

What is claimed is:

1. A fluid flow regulator comprising in combination: a housing; a valve chamber in said housing having an inlet and outlet and a port communicating with the outlet; a reciprocable piston-type valve member in said valve chamber exposed to fluid pressure and operative to throttle fluid flow through said port, said valve member having a metering orifice through which fluid passes from said inlet to said port; resilient means associated with said chamber biasing said valve member in the open position and against movement toward the closing position; an adjustable pin having a varying cross section extending through said orifice into said valve chamber; and resilient means for biasing said pin in a direction away from said port toward said inlet.

2. A fluid flow regulator comprising in combination: a housing; a valve chamber defined by said housing having an outlet and inlet and a port communicating with the outlet; an open-ended reciprocable piston-type valve member in said chamber having a skirt and a bottom wall with a fluid metering orifice therein, said valve member being arranged so that its bottom wall is exposed to pressure drop of fluid flowing through said orifice and so that upon movement the upper portion of the skirt throttles said port; resilient means associated with said chamber biasing said valve member against movement from pressure drop across said bottom wall; an adjustable pin having a varying cross section mounted in said orifice and extending into said valve member and means for biasing said pin in a direction away from said port and toward said inlet.

3. A fluid flow regulator comprising in combination: a housing; a valve chamber defined by said housing having a fluid inlet, an outlet, and a port communicating with said outlet, said inlet, port and outlet being arranged for the passage of fluid therethrough; a piston-type valve member in said chamber functioning as a unitary pressure responsive and throttling means and having a metering orifice in its base; and an adjustable elongated member having a varying cross section extending through said orifice into said valve chamber and biased in a direction away from said port and toward said inlet.

4. In a fluid flow control regulator of the type wherein a valve element is responsive to differential pressure above a certain maximum value to effect closing of the regulator, the improvement which comprises a pressure responsive and throttling element having a metering orifice and an adjustable, resiliently biased elongated member of varying cross section extending through said orifice.

5. In a fluid flow control regulator of the type wherein a valve element is responsive to differential pressure above a certain maximum value to effect closing of the valve, the improvement which comprises means for externally adjusting the flow rate of the regulator in which part of said means is a pressure responsive and throttling element having a metering orifice formed therein, and another part of said means is an adjustable, resiliently biased elongated member of varying cross section extending through said metering orifice.

6. A fluid flow regulator comprising in combination: a housing; a valve chamber in said housing provided with an annular groove in its wall constituting a port, said valve chamber having an inlet, and an outlet which communicates with said port; an open-ended reciprocable piston-type valve member in said chamber having a bottom wall with a metering orifice therein and a skirt, said valve member being constructed and arranged so that said bottom wall is exposed to pressure drop of fluid flow through said orifice and said skirt throttles said port to completely close it off in the closed position of the valve to protect the valve mechanism from back pressure in the outlet; spring-biasing means associated with said chamber biasing said valve member against movement from pressure drop across said bottom wall; an adjustable pin having a varying cross section mounted in said orifice and extending into said valve member for varying the size of the opening in said orifice and resilient biasing means between the end of said pin and one end of said valve chamber.

7. A fluid flow regulator comprising in combination: a housing having a central well therein: an adjustable retainer in the top of said well having a central bore therethrough; a threaded plug in said central bore, a valve chamber between the bottom of said well and the end of said retainer, said valve chamber having an outlet, an inlet and a port communicating with said outlet; an open-ended reciprocable, piston-type valve member in said chamber having a skirt, and a bottom wall with a fluid metering orifice therein; said valve member being constructed and arranged so that the upper section of the skirt throttles said port and its bottom wall is exposed to pressure drop from fluid flowing through said orifice; a helical spring nested between the bottom of said retainer and the upper surface of said bottom wall; an adjustable pin of varying cross section extending through said orifice into said valve chamber and into said central bore; and resilient biasing means between the end of said pin and said plug.

References Cited by the Examiner

UNITED STATES PATENTS

| 1,648,434 | 9/23 | Zander | 137—504 |
| 2,845,086 | 7/58 | Waterman et al. | 137—504 |
| 2,872,939 | 2/59 | Terry | 137—504 |
| 2,941,513 | 6/60 | Paulus | 121—97 XR |
| 2,950,733 | 8/60 | Perkins | 137—504 XR |
| 3,005,463 | 10/61 | Van Meter | 137—504 |
| 3,032,020 | 5/62 | Sneen | 121—99 |
| 3,053,236 | 9/23 | Self et al. | 121—99 |
| 3,082,787 | 3/63 | Elston et al. | 137—468 |

FOREIGN PATENTS 1,190,890  11/60  France.

M. CARY NELSON, *Primary Examiner.*

MARTIN P. SCHWADRON, *Examiner.*